No. 738,711. Patented September 8, 1903.

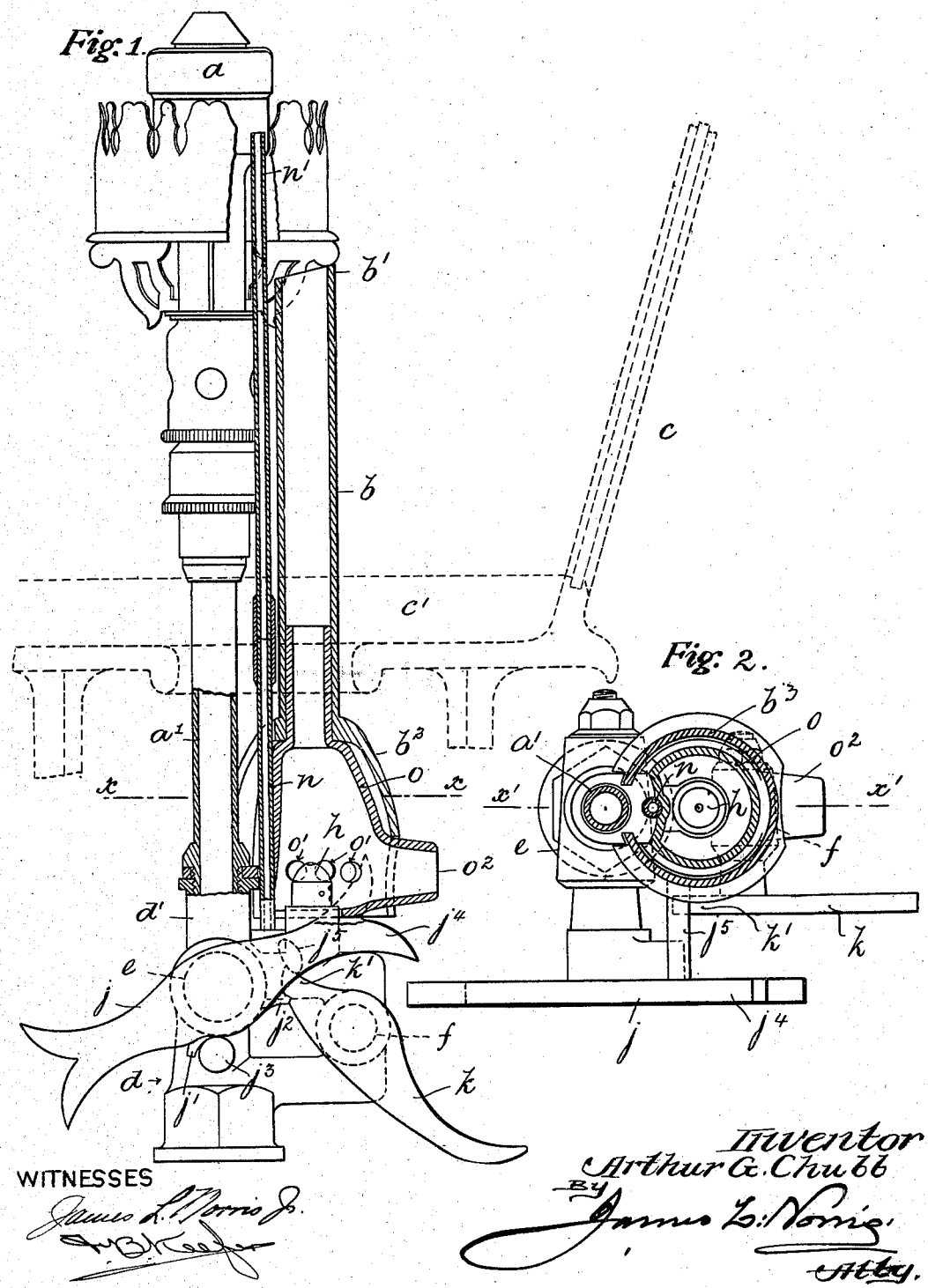

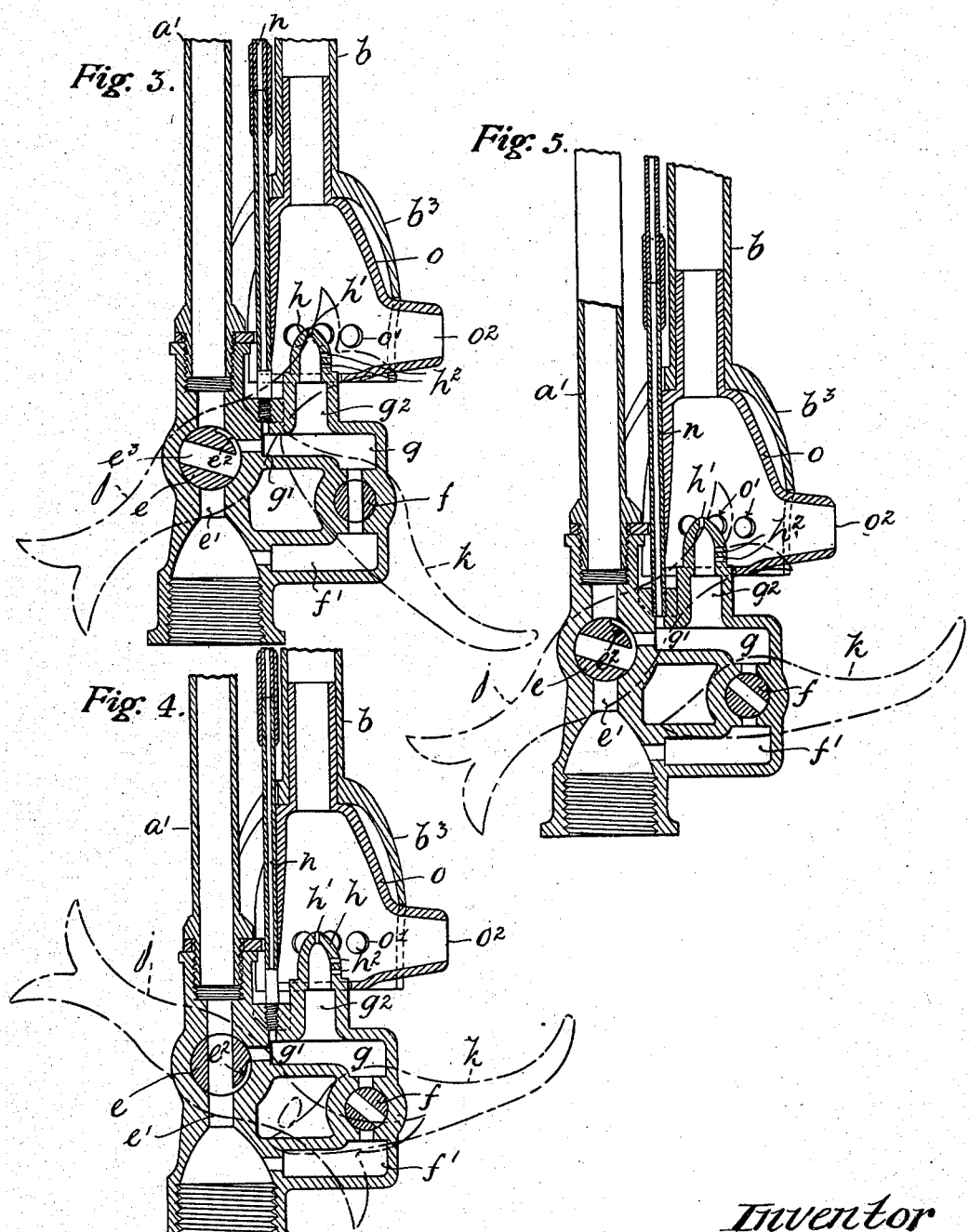

UNITED STATES PATENT OFFICE.

ARTHUR GLANVILLE CHUBB, OF IRONBRIDGE, ENGLAND, ASSIGNOR TO PARKINSON AND W. & B. COWAN, LIMITED, OF BIRMINGHAM, ENGLAND.

LIGHTING ATTACHMENT FOR GAS-BURNERS.

SPECIFICATION forming part of Letters Patent No. 738,711, dated September 8, 1903.

Application filed March 3, 1903. Serial No. 145,978. (No model.)

*To all whom it may concern:*

Be it known that I, ARTHUR GLANVILLE CHUBB, manager of company, a subject of the King of Great Britain, residing at The Lilacs, Ironbridge, in the county of Salop, England, have invented certain new and useful Improvements in Lighting Attachments for Gas-Burners, of which the following is a specification.

This invention has relation to lighting or igniting attachments principally adapted for use in connection with the burners of street gas-lamps, but also applicable to other gas-burners for general illuminating and heating purposes; and the object of the said invention as applied to street-lamps and other lamps and gas-fittings is to provide a simple and effective attachment whereby the burner of the lamp may be easily lighted and without it being necessary to open the lamp or fit the same with flaps to admit of the introduction of a light or a lighting-torch into the interior thereof.

According to the said invention it is proposed to effect the lighting of the burner of a street gas-lamp or other lamp by providing the said lamp with means whereby an explosive mixture of gas and air is formed within a tube or pipe leading from the outside of the lamp to the burner simultaneous with the admission of a limited supply of gas to the burner itself and by providing for the ignition of this mixture by an external jet, which is lighted from an ordinary torch or other lighter, the flame resulting from the explosion being conducted to the burner for lighting the gas supplied thereto, after which the full supply of gas is turned onto the burner, this motion being utilized to automatically cut off the supply of gas to the lighting attachment.

Figure 1 of the accompanying drawings represents a vertical section (but with parts in elevation) of an incandescent gas-burner for street-lamps or the like constructed and provided with supplementary lighting devices or attachments in accordance with this invention. This view shows the levers or turns of the cocks which respectively control the main gas-supply to the burner and the initial supply to the lighting attachment in the positions in which they are placed when the said initial supply is "full on" and the main supply is cut off. Fig. 2 shows a horizontal section of Fig. 1 upon the dotted line $x$. Fig. 3 shows a complete vertical section of the fittings upon the dotted line $x'$, Fig. 2, which is taken through both the cocks and through the external nipple, the cock of the lighting-up attachments being represented in its open position, while the main supply-cock is closed. Fig. 4 is a similar sectional view to that represented in Fig. 3; but the lighting-up cock is closed and the main cock is opened to admit of the full gas-supply passing to the burner. Fig. 5 also shows a similar section to that represented in Figs. 3 and 4; but in this view the two cocks are closed and gas is cut off from both the main burner and the auxiliary lighting-up devices.

The same letters of reference indicate corresponding parts in the several figures of the drawings.

In carrying out this form of the invention in its application to a street-lamp, as shown in Fig. 1, the pipe $a'$, which conveys the gas to the burner $a$, is arranged to support an auxiliary lighting-tube or ignition-pipe $b$, the open upper end $b'$ of which is located adjacent to the burner, while the lower end extends through the bottom $c'$ of the lamp-body $c$ to the outside thereof and terminates in a hood or domed, coned, or other expanded or enlarged mouth $b^2$. Both the main burner-tube and the ignition-tube are supported above the casing or body part $d'$ of a double-cock fitting $d$, provided with two cocks $e$ and $f$ and two gasways or passages $e'$ $f'$, the former of which is in connection with the burner-cock $e$ and leads from the service-pipe direct to the main burner-tube $a'$ for controlling the main supply to the burner while the latter is in connection with the cock $f$, controlling the initial gas-supply to the burner and ignition devices and leads from the said service-pipe into a branched chamber $g$, the one branch, $g'$, of which communicates with the part of the gasway $e'$ wherein the plug of the burner-cock works, and the other branch, $g^2$, is directed to a nipple or nozzle $h$, located below and in a line with the bore of the ignition-tube $b$.

In the arrangement shown in the drawings in addition to part of the initial supply of gas (through the opening of the plug $f$) passing into the burner-tube $a'$ by way of the branch $g'$ and another part passing through the nipple $h$ into the ignition-tube $b$, where it forms an explosive mixture with the drawn-in air, a third portion of the said initial supply is led into a supplementary jet-pipe $n$, which leads from the chamber $g$ of the cock-casing upwardly along one side of the ignition-tube $b$, and its upper termination $n'$ is directed or located over the open upper end $b'$ of the said tube, so that the gas issuing therefrom is ignited in the manner hereinafter explained by the flame resulting from the explosion of the mixture in the ignition-tube and forms a pilot-light which remains alight so long as gas is passing through the plug $f$ and serves to ignite that part of the initial supply which is directed to the burner, thus rendering the lighting attachment more positive or certain in its action, although it is to be understood that in some cases the burner may be lighted directly by the flash of flame resulting from the explosion of the mixture in the ignition-tube without the intervention of the said pilot-light.

The nipple $h$ for conveying the gas to the ignition-tube to form the explosive mixture therein is inclosed within a wind-screen box or chamber $o$, located within the hood at the bottom of the ignition-tube $b$ and communicating at its upper end directly with the said tube, this chamber being provided with a series of air-holes $o$, formed around the lower part of the outer walls for the admission of the air which is to be mixed in the upper part of the said chamber with the gas issuing from the hole $h'$ in the summit of the nipple. This nipple is pierced down one side with a series of small jet-holes $h^2$, and the opposite part of the walls of the chamber $o$ is formed with a nozzle or opening $o^2$, wherethrough the streams of gas issuing from the said jet-holes $h^2$ are projected when the initial gas-supply is admitted to the lighting attachments, so that when a torch or the like is applied to the outer end of the nozzle the gas passing there through is lighted, and by the current of air passing through the holes $o'$ into the chamber and up the ignition-tube the flame at the nozzle is drawn inward or caused to strike back into the chamber, and so explode the mixture that has been formed in the ignition-tube, and as the respective streams of gas are protected by the casing from the disturbing influences of high winds and the like their respective functions are not interfered with, and the appliance is rendered positive in its action under all conditions.

The plug of the burner-cock is provided on its periphery with a groove $e^2$ extending from the lower end of the plug-gasway $e^3$ to such a distance that when the said burner-plug is in its closed or cut-off position and the lighting-up plug is open, as represented in the sectional view Fig. 3, gas may pass from the chamber $g$ by way of the said groove $e'$ to the burner-tube $a'$, so that when the cocks are in this position the gas entering the chamber $g$ is divided, one part being supplied to the burner, while the other portion is further subdivided, part of the same passing to the nipple $h$, through the perforation in its tip, and thence into and up the ignition-tube, where it forms an explosive mixture of gas and air which is utilized for lighting the initial gas-supply at the burner, while the other part passes up the pilot-light tube $n$. On the other hand, when the initial-supply plug $f$ is closed and the burner-plug is fully opened, as shown in the sectional view Fig. 4, communication between the burner-tube and the chamber $g$ is closed by a solid or ungrooved part of the said plug being brought over the end of the branch $g'$, and thus the whole of the gas from the service-pipe passes directly to the burner.

The operation of a lighting attachment constructed in accordance with the foregoing description is as follows: When the initial supply is turned on by the opening of the cock $f$, and a torch or the like is applied to the mouth of the nozzle $o^2$, the stream of gas issuing therefrom is first ignited, and then under the influence of the upward draft created by the rising air-currents within the ignition-tube this flame is made to strike inward, or light back into the interior of the chamber $o$, whereby the mixture of gas and air within the ignition-tube is exploded and the flame created by the explosion is carried up the said tube into the interior of the lamp, where it lights the gas issuing from the supplementary pipe $n$, thereby establishing a pilot-light, from which the initial supply of gas to the burner becomes ignited. The full supply of gas is now turned onto the burner by opening the cock $e$, which at the same time closes the communication between the burner-tube and the initial-supply cock, and in order to automatically and simultaneously cut off the initial supply to the burner, the nipple $h$, and the pilot-light the plug of the said cock $e$ is provided with a double-armed lever $j$, whose movement in both directions is limited by stops $j'$ $j^2$ on its lower edges, adapted to come against a peg $j^3$, standing from the side of the plug-casing. The one arm or branch $j^4$ of the said lever has a stud or right-angled projection $j^5$ arranged to overhang or come in the path of an arm or extension $k'$ of the lever $k$ of the initial-supply cock $f$, the arrangement of the several parts being such that when the burner-cock lever $j$ is turned into the position shown in Fig. 4 for opening the full supply the impingement of the said stud $j^5$ on the lever extension of the other cock turns the latter in the reverse direction, so that as the one cock is opened the other is closed, but the turning of the main-burner-cock lever in the opposite direction for cutting off the gas to extinguish the lamp does not affect the position of the initial-supply-cock lever, which remains closed, as shown in Fig. 5, until the burner requires to be again lighted.

Any other connection between the levers of the two cocks may be employed which will effect the closing of the lighting-attachment cock by the fully opening of the main-burner cock, but will not transmit motion in the opposite direction when the burner-cock is closed.

The application of the invention (the essential feature of which resides in the means for conveying to a burner or to a pilot-light the flame produced by the explosion of a mixture of gas and air) to other lamps and gas-fittings for lighting and heating purposes differs in no essential respect from its application to a street gas-lamp as herein described.

Having fully described my invention, what I desire to claim and secure by Letters Patent is—

1. A lighting attachment for gas-burners, comprising in combination with the burner-tube, a pilot-light tube arranged in suitable relation to said burner-tube, an ignition-tube arranged in suitable relation to said pilot-light tube and said burner-tube, said pilot-light tube extending above said ignition-tube and said ignition-tube communicating with the atmosphere, and means for suitably establishing communication between the said tubes and a gas-supply.

2. A lighting attachment for gas-burners comprising in combination with the burner-tube, a pilot-light tube arranged in suitable relation to said burner-tube, an ignition-tube arranged in suitable relation to said pilot-light tube and said burner-tube, said pilot-light tube extending above said ignition-tube and said ignition-tube communicating with the atmosphere, and means for supplying gas simultaneously to said tubes.

3. A lighting attachment for gas-burners comprising in combination with the burner-tube, a pilot-light tube arranged in suitable relation to said burner-tube, an ignition-tube arranged in suitable relation to said pilot-light tube and said burner-tube, said pilot-light tube extending above said ignition-tube and said ignition-tube communicating with the atmosphere, means for simultaneously supplying gas to the said tubes, and means for cutting off the supply of gas to said pilot-light and ignition tubes and for supplying gas to said burner-tube.

4. A lighting attachment for gas-burners, comprising in combination with the burner-tube, a pilot-light tube arranged in suitable relation to said burner-tube, an ignition-tube arranged in suitable relation to said pilot-light tube and said burner-tube, a cock for establishing communication between the said tubes and the gas-supply, a lever for operating said cock, a cock for establishing communication between said burner-tube and a gas-supply, an operating means for said last-mentioned cock, said operating means adapted when operated in one direction to engage and operate said lever to close said first-mentioned cock and cut off the supply of gas to said pilot-light tube and said ignition-tube.

5. A lighting attachment for gas-burners comprising in combination with a burner-tube, an ignition-tube arranged in suitable relation to said burner-tube and having a chambered lower end, a box communicating with the said ignition-tube and provided with a nozzle, and a nipple extending in said box and communicating with a gas-supply.

6. A lighting attachment for gas-burners, comprising in combination with a burner-tube, an ignition-tube arranged in suitable relation to said burner-tube and having a chambered lower end, a box communicating with the said ignition-tube and provided with a nozzle, a nipple extending in said box and communicating with a gas-supply, and a pilot-light tube arranged in suitable relation with the said burner-tube and ignition-tube and suitably communicating with the gas-supply.

7. A lighting attachment for gas-burners, comprising in combination with a burner-tube, an ignition-tube, a gas-cock for establishing communication between the said tubes and a gas-supply, a gas-cock for establishing communication between the said burner-tube and a gas-supply, a lever for operating the first-mentioned cock, and operating means for the said second-mentioned cock, said operating means when operated in one direction adapted to engage said lever and close the first-mentioned cock, thereby cutting off the supply of gas to said ignition-tube.

In testimony whereof I have hereunto set my hand in presence of two subscribing witnesses.

ARTHUR GLANVILLE CHUBB.

Witnesses:
GEORGE ERNEST JONES,
ARCHIBALD GEORGE BARLOW.